No. 849,522. PATENTED APR. 9, 1907.
E. C. ADAMS.
ARTIFICIAL FISH BAIT.
APPLICATION FILED JUNE 7, 1906.
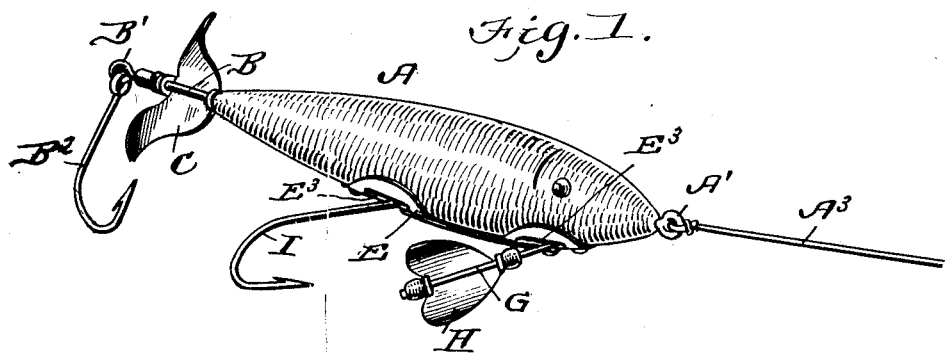
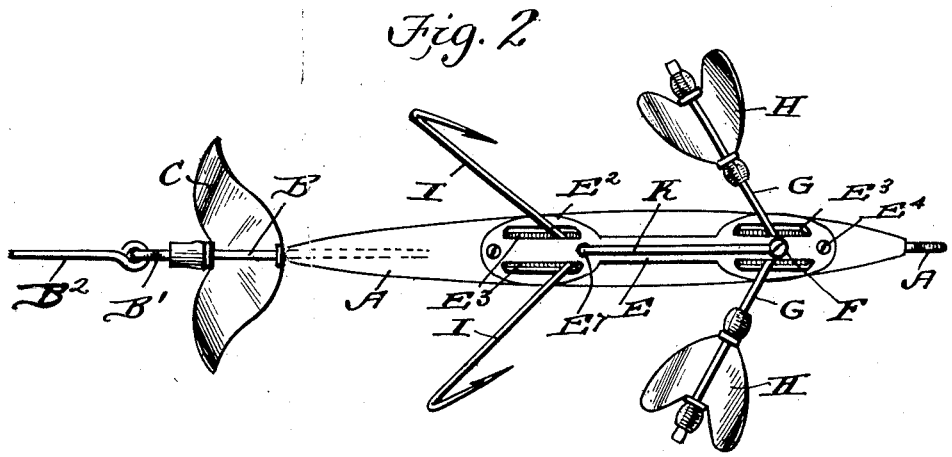
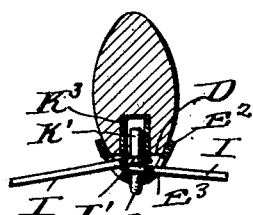
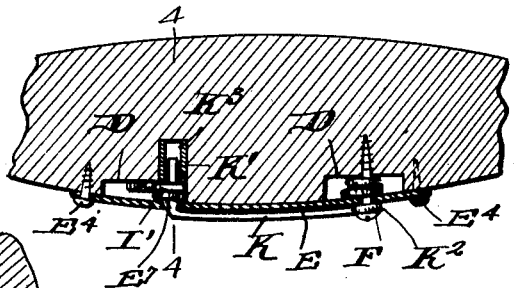
WITNESSES:
INVENTOR.
E. C. Adams.
BY O'Meara & Brock
ATTORNEYS

UNITED STATES PATENT OFFICE.

EDWARD C. ADAMS, OF MORRISTOWN, NEW JERSEY.

ARTIFICIAL FISH-BAIT.

No. 849,522.

Specification of Letters Patent.

Patented April 9, 1907.

Application filed June 7, 1906. Serial No. 320,599.

*To all whom it may concern:*

Be it known that I, EDWARD C. ADAMS, a citizen of the United States, residing at Morristown, in the county of Morris and State of New Jersey, have invented a new and useful Improvement in an Artificial Fish-Bait, of which the following is a specification.

This invention relates generally to artificial bait, and more particularly to an artificial minnow, which is adapted to be pulled through the water on the end of the line; and the object of the invention is to construct an artificial bait in such manner as to prevent the turning of the body while the bait is being drawn through the water; and a still further object is to so construct the mechanical features as to maintain the semblance of a fish; and with these objects in view the invention consists of the novel features of construction, combination, and arrangement, all of which will be fully described hereinafter and pointed out in the claims.

In the drawings forming a part of this specification, Figure 1 is a perspective view of a bait constructed in accordance with my invention. Fig. 2 is an inverted plan view of the same. Fig. 3 is a detail longitudinal section view. Fig. 4 is a transverse sectional view drawn on line 4 4 of Fig. 3. Fig. 5 is a detail perspective view showing a portion of the bottom of the body of the fish. Fig. 6 is a detail view of the metal plate prior to being fastened to the body.

In carrying out my invention I employ a body portion A, which is made of any suitable material and is fashioned after the shape of a minnow and may be so colored and marked, if desired. At the forward end is an eye $A'$, to which the line $A^2$ is attached, and projecting from the rear end is a shank B, terminating in an eye $B'$, carrying a hook $B^2$, and mounted upon this shank B, between the end of the body and the eye $B'$, is the end or tail spinning-blade C.

The body A is preferably cut away at two points D, as most clearly shown in Figs. 3 and 5, and a plate E is secured to the bottom of the body, said plate being of such length as to extend across both cut-away portions D.

The plate E comprises the central longitudinal bar $E'$ and the circular end portions $E^2$, each circular portion being slotted longitudinally, as shown at $E^3$. This plate is secured by means of suitable screws $E^4$, which pass through the end apertures $E^5$. Each circular end portion is also provided with two other apertures $E^6$ and $E^7$, respectively, and passing upwardly through the aperture $E^6$ into the body portion A is a screw F, and it will be noted that this opening $E^6$ is arranged opposite the forward cut-out portion D.

Rods or axles G are pivoted at their inner ends upon the screw F in the cut-away portion D, and mounted on each rod or axle G is a spinning-blade H, which in general shape and figuration resembles the forward fins of a fish, and it will be noted that the rods or axles G extend through the longitudinal openings $E^3$ and are thereby permitted to have a back-and-forth swinging movement.

I indicates the hooks, having eyes $I'$ at their inner ends, and which are located in the rear cut-away portion D and are held in place by means of the upturned end $K'$ of a spring-rod K, which is fastened at its forward end $K^2$ by means of the screw F, which passes through the plate and screws the rods or axles upon which the forward spinning-blades are carried, and this upwardly-projecting end $K'$ passes through the opening $E^7$ and fits into a tube $K^3$, arranged in the body portion A. The shanks of the hooks play back and forth in the slots $E^3$, and whenever it is desired the hook can be quickly and easily detached by withdrawing the upturned end of the spring-rod, and the hooks can then be quickly and easily removed.

From the above description, taken in connection with the accompanying drawings, it will be seen that I provide an exceedingly simple and efficient form of artificial bait in which two oppositely-disposed spinning-blades are arranged adjacent the forward end of the fish and which turn in the opposite directions as the bait is drawn through the water and will cause the said bait to move in a straight line and always maintain its probable upright position and will positively prevent the spinning of the body portion and consequent entanglement of the line. The end spinning-blade also materially assists in this operation. By having the forward spinning-blades constructed and arranged as shown the resemblance of the fish is carried out, and by having the hooks quickly and easily detachable they can be removed from the body whenever it is necessary.

Having thus fully described my invention, what I claim as new, and desire to secure by Letters Patent, is—

1. The combination with a body portion provided with cut-away portions, of a slotted plate arranged over said portions, hooks provided with eyes arranged in said slots and a spring-rod secured to said body adapted to pass through the eyes of the hooks for locking said hooks therein.

2. An artificial bait comprising the body portion having spaced cut-away portions, a plate provided with spaced slots adjacent each end secured to said body over said cut-away portions, rods pivotally mounted in one pair of slots carrying spinners, hooks provided with eyes arranged in the other pair of slots, and a spring-rod secured to said plate, passing through said eyes of the hooks, for the purpose described.

3. An artificial bait comprising a body portion, oppositely-disposed spinning-blades arranged adjacent the forward end of the body, said blades being free to swing back and forth, hooks mounted in the body portion intermediate the ends and projecting in opposite directions and a spring-rod for securing said hooks in place as set forth.

4. An artificial bait comprising a body portion provided with a cut-out portion and having a spinning-blade at the rear end and a hook arranged at the end of said spinning-blade, oppositely-disposed spinning-blades arranged adjacent the forward end of the body portion, said spinning-blades being free to move back and forth, and hooks provided with eyes mounted in the cut-out portion of the body portion intermediate the ends and a spring-rod mounted on said body adapted to pass through the eyes of said hooks, substantially as described.

5. An artificial bait comprising a body portion cut away at definite points upon the under side, a plate secured to the under side of the body portion and longitudinally slotted adjacent its opposite ends, rods or axles passing through the forward slots and pivotally connected to the body portion, spinning-blades arranged upon said rods or axles, hooks provided with eyes having their shanks, passed through the rear slots of the blade and a spring-rod connected to the body portion and adapted to pass upwardly through the plate and through the eyes of the hooks, and a spinning-blade arranged at the rear end of said body portion substantially as described.

EDWARD C. ADAMS.

Witnesses:
JOSEPH F. NUGENT,
WILLIAM F. DORNITZ.